US007499706B1

United States Patent
Kallio et al.

(12) United States Patent
Kallio et al.

(10) Patent No.: US 7,499,706 B1
(45) Date of Patent: Mar. 3, 2009

(54) NETWORK FREQUENCY SETTING

(75) Inventors: Janne J. Kallio, Ylöjärvi (FI); Tero Rantala, Tampere (FI); Markku Rautiola, Tampere (FI); Pekka Rissanen, Tampere (FI); Kari Tuovinen, Lempäälä (FI); Jan Parkkinen, Oulu (FI); Alexander Esser, Espoo (FI); Philip Wesby, Espoo (FI)

(73) Assignee: Nokia Corporation, Espoo (FI)

( * ) Notice: Subject to any disclaimer, the term of this patent is extended or adjusted under 35 U.S.C. 154(b) by 1164 days.

(21) Appl. No.: 10/070,411

(22) PCT Filed: Sep. 5, 2002

(86) PCT No.: PCT/GB00/03412

§ 371 (c)(1),
(2), (4) Date: Oct. 9, 2002

(87) PCT Pub. No.: WO01/19106

PCT Pub. Date: Mar. 15, 2001

(30) Foreign Application Priority Data

Sep. 6, 1999 (GB) ................................. 9921008.0

(51) Int. Cl.
*H04Q 7/20* (2006.01)
(52) U.S. Cl. ....................... 455/450; 455/447; 455/448; 370/324; 370/329
(58) Field of Classification Search ......... 455/447–422, 455/560; 370/324–330, 431, 436, 503, 519–520, 370/350

See application file for complete search history.

(56) References Cited

U.S. PATENT DOCUMENTS

| 4,774,704 | A | * | 9/1988 | Gass et al. | 370/294 |
|---|---|---|---|---|---|
| 5,448,570 | A | | 9/1995 | Toda et al. | 370/95.3 |
| 5,613,211 | A | * | 3/1997 | Matsuno | 455/502 |
| 5,761,195 | A | * | 6/1998 | Lu et al. | 370/329 |
| 6,141,336 | A | * | 10/2000 | Bauchot et al. | 370/348 |
| 6,185,205 | B1 | * | 2/2001 | Sharrit et al. | 370/389 |
| 6,671,291 | B1 | * | 12/2003 | Soliman | 370/503 |

FOREIGN PATENT DOCUMENTS

WO            9418764            8/1994

* cited by examiner

*Primary Examiner*—George Eng
*Assistant Examiner*—Marcos L Torres
(74) *Attorney, Agent, or Firm*—Ware, Fressola, Van Der Sluys & Adolphson, LLP

(57) ABSTRACT

A frequency setting unit for a radio telecommunications network comprising a first, reference base station transmitting signals at a first frequency, and a second base station transmitting at a second frequency; the frequency control unit comprising: a radio receiver for receiving signals from the first base station; analysis apparatus for analysing the received signals to determine the first frequency; and feedback apparatus responsive to the decoding apparatus and coupled to the second base station for adjusting the second frequency with the aim of establishing a desired relationship between the second frequency and the first frequency.

27 Claims, 3 Drawing Sheets

NETWORK FREQUENCY SETTING

CROSS-REFERENCE TO RELATED APPLICATIONS

Priority is claimed from International Application PCT/GB00/03412 filed 5 Sep. 00, which in turn claims priority from Great Britain Application GB 9921008.0, filed 6 Sep. 99.

BACKGROUND OF THE INVENTION

1. Technical Field

This invention relates to setting an operating frequency in a network. The network could be a wireless telecommunications network such as a cellular radio network.

2. Discussion of Related Art

FIG. 1 shows schematically the configuration of a typical wireless cellular telecommunications network. The network comprises a number of base-stations (BSs) 1, 2, 3 etc. Each base-station has a radio transceiver capable of transmitting radio signals to and receiving radio signals from the area of an associated cell 4, 5, 6. By means of these signals, the base-stations can communicate with a terminal 9 which may be a mobile station (MS) in the associated cell. That terminal itself includes a radio transceiver. Each base station is connected via a base station controller (BSC) 7 to a mobile switching centre (MSC) 8, which is linked in turn to the public telephone network (PSTN) 10. By means of this system a user of the mobile station 9 can establish a telephone call to the public network 10 via the base station in whose cell the mobile station is located. The location of the terminal 9 could be fixed (for example if it is providing radio communications for a fixed building) or the terminal could be moveable (for example if it is a hand portable transceiver or "mobile phone").

In networks that operate according to the GSM (Global System for Mobile communications) standard base stations must maintain a relative frequency accuracy of $5 \times 10^{-8}$ on the air interface between them and mobile stations. One way to achieve this accuracy would be to provide a highly accurate clock at each base station. However, clocks of the required accuracy would generally be too expensive for this approach to be economical.

In commercial networks the normal solution is to implement a single central highly accurate reference clock (11 in FIG. 1) for the network. A clock signal from this clock is then conveyed as a pulse train (illustrated at 12) along the national telephone backbone, and then along the GSM infrastructure (via the MSC and the BSC) to each base station. The central reference clock typically has a relative frequency stability of $10^{-11}$ over 24 hours. However, the transmission chain to a base station can be long, and this introduces jitter and wander in the clock signal as received by the base station. The base station typically relies on receiving the signal with an accuracy of $1.5 \times 10^{-8}$ at its 2 MBit/s PCM (pulse code modulated) Abis interface. The transcoder inside the base station typically has a 16 MHz clock (divided down to 2 MHz). This is phase locked to the received PCM clock pulses, jitter and wander above 2 Hz is filtered out, and the signal is averaged over a period of approximately 15 minutes. Having been cleaned in this way the 2 MHz clock signal has an improved accuracy and serves as a reference clock for a 26 MHz clock for the base station. All frequencies and timing on the air/radio interface of the base station are ultimately derived from this 26 MHz clock.

This method has a number of drawbacks. First, it relies on there being a continuous stream of pulses to the base station. If the network carrying the pulse fails then the frequency transmission chain from the fixed network to the base station is broken and accurate synchronisation of the radio network is lost. Also, if part of this transmission chain to the base station runs across a non-clocked network then there may be very significant jitter in the pulse train received at the base station. This is a particular concern for systems where the radio network is integrated with a packet-based network such as the internet or an intranet, which is used to carry traffic between the base station and the external telephone network. One example of such a system is the WIO/GIO (Wireless Intranet Office/GSM Intranet Office) system under development by the applicant. In that system it has been proposed that the BSC should be implemented as a distributed unit, with its components being interconnected over an IP (internet protocol) based network such as a company's intranet. IP-based protocols may then be used for all communications, for instance by employing the H.323 protocol for transmission of speech, and signalling. IP networks are not clocked since they operate asynchronously, and accordingly transmission times are highly variable and unpredictable. The components of the proposed WIO/GIO system that are most important in the present context are the A-gateway to the MSC and the IMC (Intranet Mobile Clusters) which each connect to one base station with a PCM or HDSL (High bit-rate Digital Subscriber Line) link, since these would conventionally be expected to be used for transmission of the PCM clock pulses to the base stations. Transmission and network access times are highly variable and unpredictable on IP networks. On a single LAN, transmission times typically are below 10 ms in low traffic situations. In an extensive intranet, transmission times can be higher. Access times are always negligible if the network is not congested. Providing additional cables for carrying a clock signal works against the primary reason for using the intranet: making better use of an existing network.

SUMMARY OF INVENTION

There is therefore a need for a system that allows base stations to be synchronised to a desired degree of accuracy without the disadvantages of the approaches described above.

According to one aspect of the present invention there is provided a frequency setting unit for a radio telecommunications network comprising a first, reference base station transmitting signals at a first frequency, and a second base station transmitting at a second frequency; the frequency control unit comprising: a radio receiver for receiving signals from the first base station; analysis apparatus for analysing the received signals to determine the first frequency; and frequency setting apparatus responsive to the decoding apparatus and coupled to the second base station for adjusting the second frequency with the aim of establishing a desired relationship between the second frequency and the first frequency.

According to a second aspect of the invention there is provided a telecommunications network comprising such a frequency setting unit.

According to a third aspect of the present invention there is provided a method for frequency setting in a wireless telecommunications network comprising a first, reference base station transmitting signals at a first frequency, and a second base station transmitting at a second frequency; the method comprising the steps of: receiving signals from the first base station; analysing the receiving signals to determine the first frequency; and adjusting the second frequency with the aim of establishing a desired relationship between the second frequency and the first frequency.

Suitably, in consequence of the said frequency adjustment operation the second base station correspondingly transmits on the second frequency with an accuracy in frequency corresponding to the accuracy in frequency of the first base station. This may provide a convenient means to allow the second base station to transmit within required specifications of accuracy of frequency.

The said signals from the first base station may be broadcast signals. The said signals suitably include a repeated feature that may be identified by the analysis apparatus to determine the first frequency.

The second base station may comprise a clock whose frequency is set by means of the frequency setting apparatus. The clock may be set by means of a clock setting signal from the frequency setting apparatus. The clock setting signal may signal the clock to be advanced or retarded or may comprise a clock pulse train to which the clock's frequency is matched. The frequency setting apparatus is suitably capable of sending such a signal to the second base station.

The first base station and the second base station may be of the same radio telecommunications network or of different radio telecommunications networks.

The frequency setting unit is preferably comprised in a unit capable of performing base station controller functions for the second base station. This is most preferably a base station controller of the second base station. An antenna for the receiver may be located remotely from the said base station controller for reception of signals transmitted by the first base station.

The present invention provides particular benefit when the second base station is connected to another telecommunications network by means of a connection that is at least in part asynchronous, employing for example an internet protocol at some point between the second base station and the interface to that other network. The link for voice or data traffic and/or signalling between the second base station and its base station controller may be an asynchronous connection. In that case an additional synchronous connection may be provided between the two for carrying clock setting signals from the frequency setting unit.

The network of which the second base station is part may be operable according to the GSM (Global System for Mobile communications) standard or a derivative thereof, or another standard. The network is preferably a cellular telephony network.

The said desired relationship is suitably a predetermined desired relationship. The relationship is preferably such that the first frequency and the second frequency are equal, but alternatively the relationship may be such that the first frequency and the second frequency are offset by a desired and/or predetermined amount, or that the first frequency is a predetermined multiple of the second frequency. The said multiple may be greater than or less than unity.

The system of the invention preferably operates to establish the said desired relationship. The system most preferably operates with the aim of maintaining, or to maintain, that relationship.

BRIEF DESCRIPTION OF THE DRAWING

The present invention will now be described by way of example with reference to the accompanying drawing, in which, as mentioned.

DETAILED DESCRIPTION OF PREFERRED EMBODIMENTS

Figure 1:
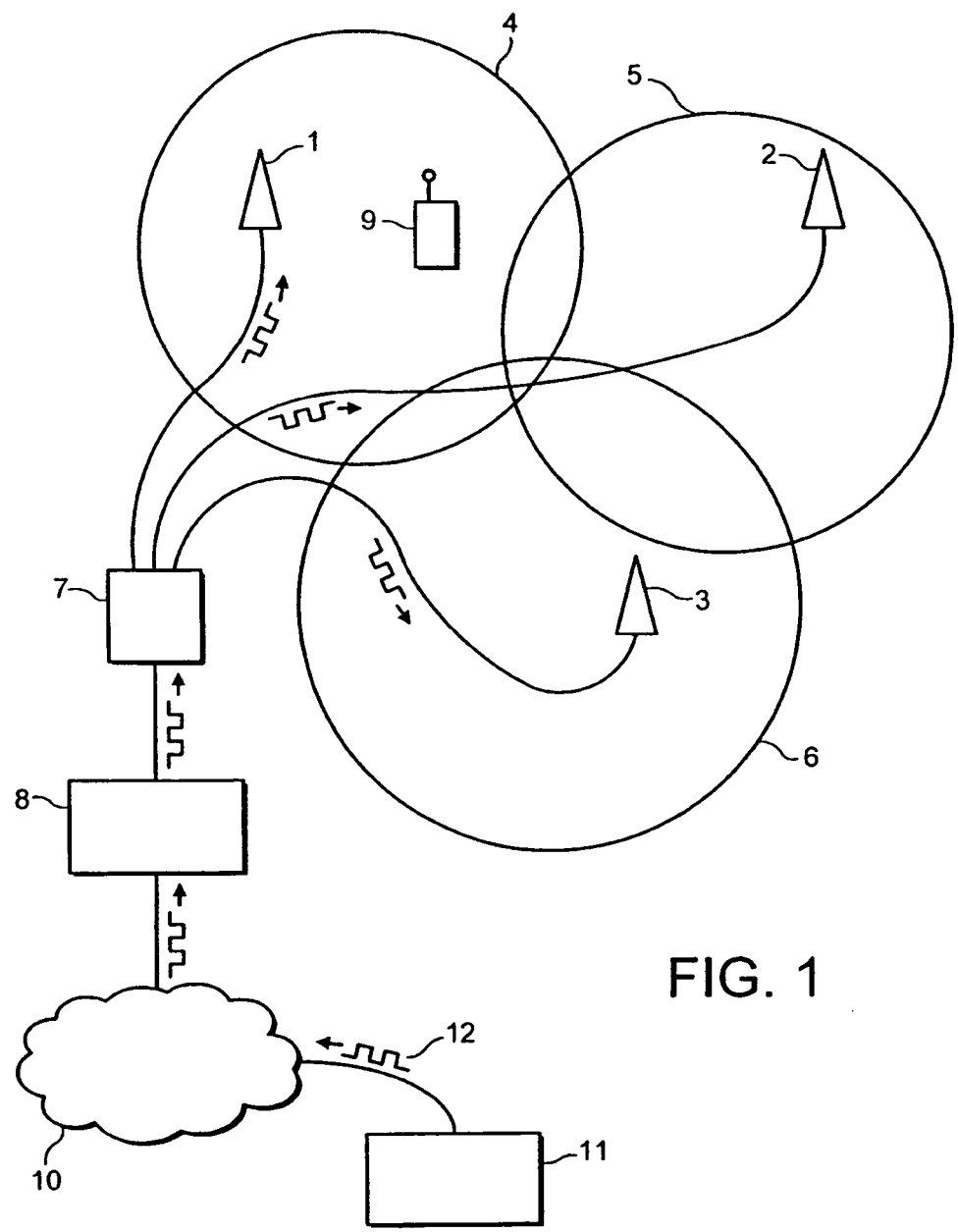
FIG. 1 shows schematically the configuration of a typical wireless cellular telecommunications network.
Figure 2:
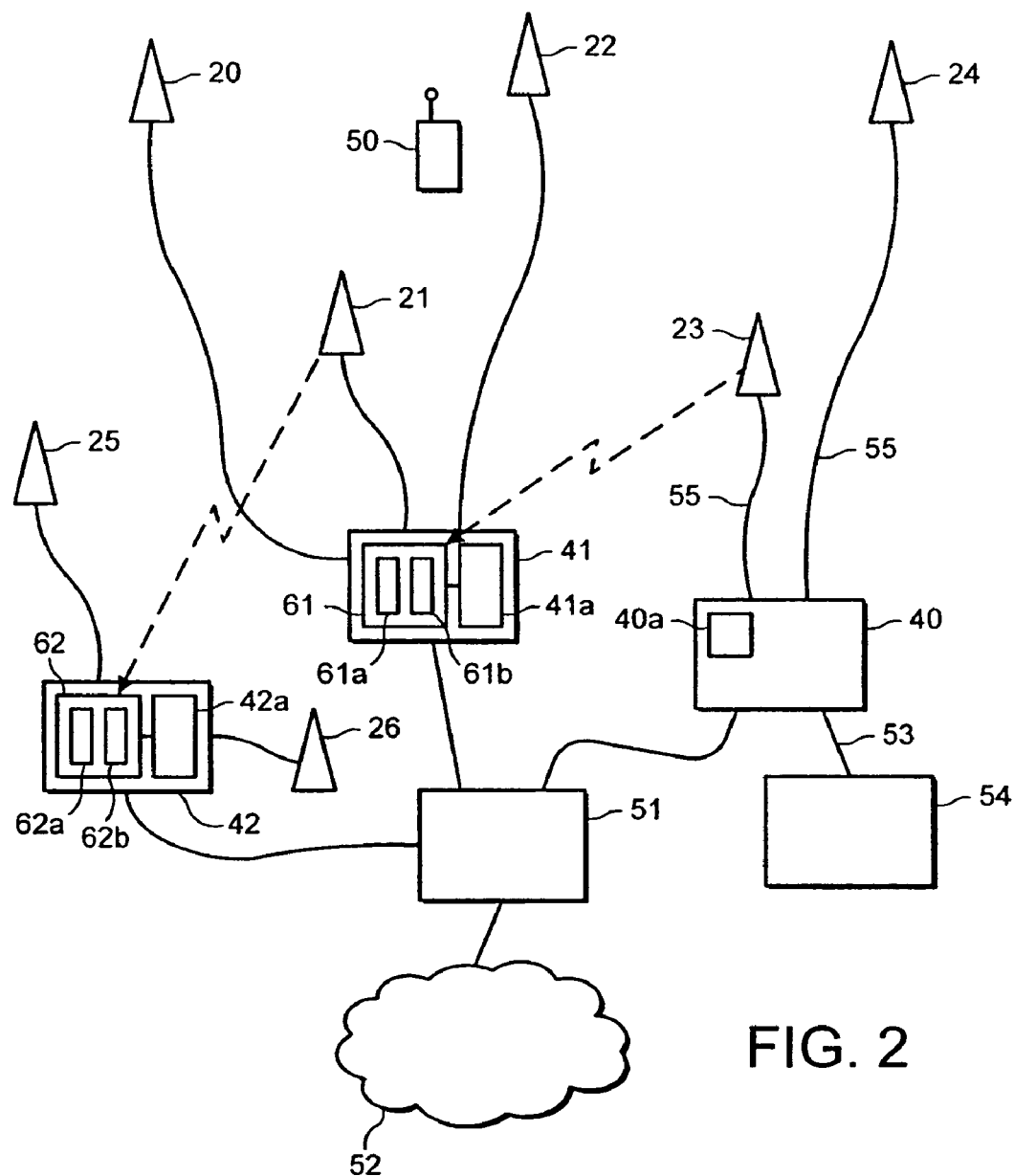

The system shown in FIG. 2 is structurally similar to that shown in FIG. 1. The system of FIG. 2 comprises base stations 20-26, each of which has a radio transceiver capable of transmitting radio signals to and receiving radio signals from the area of an associated cell. By means of these signals the base stations can communicate with a terminal 50 (which may comprise or be a mobile telephone or suitably modified mobile telephone) in the associated cell. That terminal itself includes a radio transceiver. Each base station is connected by a synchronous link to its respective base station controller (BSC) 40, 41, 42, and via the respective BSC to a mobile switching centre (MSC) 51, which is linked in turn to the public telephone network (PSTN) 52.

The system of FIG. 2 includes several BSCs which control respective groups ("clusters") of base stations. One of the BSCs, BSC 40, is connected by a synchronous fixed wire link 53 to a highly accurate reference clock 54. A clock pulse train from the clock 54 is sent to the BSC 40 along the link 53. This clock pulse train is used by the BSC to derive a set of clock pulse trains that are sent by a frequency setting unit 40a in the BSC 40 over the respective synchronous links 55 to the base stations 23, 24 that are under the control of the BSC 40. In this way the frequency at those base stations is set accurately.

The base stations 23, 24 thus transmit signals at an accurately set frequency that is derived precisely from the frequency of the reference clock 54. According to the present embodiment of this invention, those transmitted signals are used to accurately set the frequencies of the clocks of the other base stations 21 etc. of the system. The BSC 40 acts as an initial reference BSC and the base stations 23, 24 under its control act as initial reference base stations. The accurately set frequency of those base stations is passed to other base stations of the network, cascading from base stations under the control of BSCs that may be termed as "higher" in a frequency-setting hierarchy on to those that are under the control of "lower" BSCs. This process will be described in more detail below.

Each BSC 41, 42 lower in the hierarchy than the reference BSC 40 has a synchronisation unit 61, 62. Each synchronisation unit includes a radio receiver 61a, 62a and a radio analysis unit 61b, 62b. The synchronisation units could be based on conventional mobile handsets with suitable modifications, such as for example a higher timing accuracy. The synchronisation units are coupled to the frequency setting units 41a, 42a of their respective base stations, which generate frequency setting signals for the relevant base stations in dependence on signals received from the synchronisation units 61, 62. The network is planned so that the radio receiver of the synchronisation unit of each BSC is located (or at least has an antenna that is located) where it can receive radio transmissions from a base station that is under the control of a BSC that is higher in the hierarchy than the BSC to which the radio receiver is attached. In the system shown in FIG. 2 BSC 41 is lower in the hierarchy than the reference BSC 40, and BSC 42 is lower still. The receiver 61a of BSC 41 is located in the coverage area of base station 23, which is under the control of BSC 40. The receiver 62a of BSC 42 is located in sufficiently near base station 21, which is under the control of BSC 41, to be able to receive signals from it at sufficient accuracy to determine their frequency.

Each synchronisation unit is capable of detecting an appropriate signal (e.g. the BCCH signal in a GSM-type network) and synchronising to it in the same way as a conventional mobile station.

To fix the frequency of the clocks of the base stations that are under the control of BSC 41 receiver 61a receives signals from the reference base station 23. These signals are analysed by analysis unit 61b to determine their frequency. The result of this analysis is used by the frequency setting unit 41a to set the frequencies of the base stations 21, 22. This may be done in a number of ways. The BSC 41 could have an internal clock that (e.g. in the frequency setting unit 41) that is set first, with the signals to the base stations 21, 22 being simply derived from that clock. Alternatively, the signals to the base stations 21, 22 could be derived straight from the detected frequency, without the intermediate step of setting the BSC's clock. In either case, the relevant clock could be set in an absolute manner to match the required derived frequency or a desired multiple of the received frequency by shifting the frequency of the clock of BSC 40 in a direction determined by a measurement of the difference in frequency between it and the received clock frequency. In a preferred method, once the clock of BSC 40 has been set, BSC 40 can send signals to set clocks of the base stations 21, 22 under its control, either in an absolute manner or by frequency shifting. Once the frequencies of the base stations under the control of BSC 40 have been set, the frequencies of the base stations under the control of BSC 41 can be set in an analogous way by means of units 62 and 42a. In a larger network the frequency setting could propagate through the whole network and is effective while the frequency accuracy is maintained during the frequency transfer process.

Figure 3:
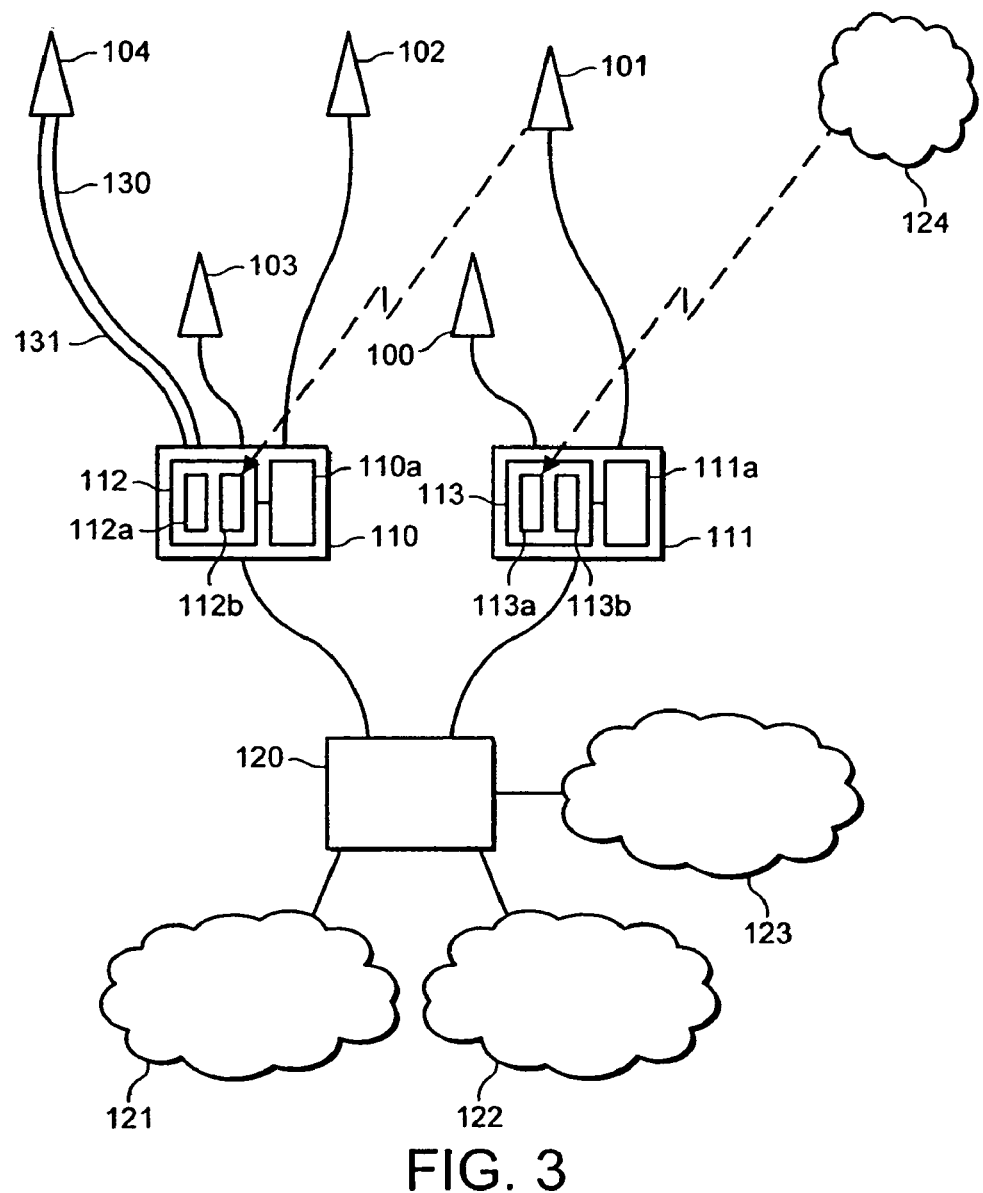

FIG. 3 shows schematically one example of the possible architectures of an IP-network-based cellular architecture. As in the more conventional cellular system described above, the system includes sets of base stations 100-104 under the control of respective IMC (intranet mobile cluster) units 110, 111. The IMC units are linked to a gateway unit (GWU) 120 via which the network as shown can be connected to an external public telephone network 121 for placing and receiving calls, a cellular network 122 for support functions such as address look-up and an IP network 123 which could be a company intranet or the internet for sending and receiving data and placing and receiving calls using protocols such as H.323. In the system of FIG. 3 the connections between any of the units—for instance between the base stations and the IMCs, between the IMCs and the GWU, or between the GWU and other networks—could be implemented using one or more asynchronous protocols such as internet protocol. Therefore, frequency setting poses a particular problem in the system of FIG. 3 because of the potential difficulties of conveying clock signals precisely to the base stations.

The frequency setting operation described above in relation to FIG. 2 could be used in an analogous way in the network of FIG. 3. The setting functions performed by the BSCs in the system of FIG. 2 could be performed by the IMC units in the system of FIG. 3. As shown in FIG. 3, synchronisation units 112, 113, each comprising a receiver 112a, 113a and an analysis unit 112b, 113b, and frequency setting units 110a, 111a could be provided for setting the frequencies of the base stations 100-104. In the system of FIG. 3 the reference cluster could be set by a highly accurate reference clock or, as illustrated, one or more clusters in the system of FIG. 3 could set their frequencies by reference to signals received from an external radio telephone network. In the illustrated embodiment the receiver 113a receives a signal from an overlapping cellular network 124 for synchronisation of base stations 100, 101 and the receiver 112a receives a signal from base station 101 for synchronisation of base stations 102-104. Alternatively, the frequency setting unit 111a could derive its frequency from an accurate reference clock and/or the frequency setting 111a could derive its frequency from the network 124.

The system of FIG. 3 could be configured to operate at a frequency and according to the protocol of a standard radio telephone system such as GSM. In that case it is especially convenient if a reference cluster and/or other clusters in the system of FIG. 3 receive signals from that external cellular network and use those to set their own frequencies. The practicality of this approach is increased when the coverage of the external cellular network overlaps that of the IP-network-based system so that receivers for receiving signals from the external cellular network do not need to be remote from the IP-network-based system.

In view of the typical architecture of a BSC and the anticipated architecture of a commercial implementation of an IMC the frequency analysis unit could be provided on an expansion card for a BSC or IMC. If appropriate the receiver unit could be provided on the same card or could be connected remotely via a cable link.

It is possible for the receiver and/or frequency analysis units to be provided in or at a base station. The relevant frequency setting signals could be passed from there to other base stations of its cluster via its BSC/IMC, or each base station could have its own receiver and analysis unit. However, for several reasons this latter approach is unlikely to be preferred. Adding such hardware to a base station would increase the costs of the base station, which would not be justified if the base station were deployed in the conventional way, i.e. connected to a clock feeding PCM or HDSL line. And the IMC/BSC might need an especially accurate direct link to the received clock signals to perform its BSC/IMC functions. Also, it is likely to be easier to arrange that the additional radio receiver is not overloaded by the relatively high-power radio output of the internal antenna of a base station if it is not located at a base station.

Since the accurate clock signal generated in the IMC/BSC is used as a reference clock signal for the base station, the base station itself thus only needs a relatively inexpensive clock. For example, it may be possible to use a clock of the type used in a typical mobile phone if the signalling between the IMC/BSC and the base station were adequate.

The clock signal could be sent from the IMC/BSC to the base station as a 2 MHz pulse train.

It is possible that the IMC and the base station may be connected by an asynchronous link such as a USB. (Such a link is illustrated at 130 between IMC 110 and base station 104 in FIG. 3). In that case a dedicated cable 131 should be provided to carry clock pulses to the base station. If the IMC/BSC and the base station are already connected by a link that supports PCM then an extra cable might not be needed. For instance, the HSCSD PC expansion card normally used could receive its clock feed through a cable (which may or may not be an additional cable) connected to the reference clock expansion card of either solution. The clock signal can then be transmitted over the Abis interface as usual. If the base station presents a separate clock input interface, then a dedicated clock cable can again be used. Since the base station then does not have to derive the clock signal from the PCM pulses, a less accurate reference clock signal is necessary to meet the given accuracy specification for the base station. An accuracy of $2\times10^{-6}$ to $3\times10^{-8}$ is estimated to be sufficient, instead of $1.5\times10^{-8}$.

At the IMC/BSC the receiver/analysis hardware may be combined with the interface hardware for the link to the base station(s) or may be implemented separately.

In order for the receiver/analysis hardware to correctly pick up the required frequency for the clock control method there should be knowledge of the frequency it is to detect. Thus it or the IMC/BSC in which it is installed may store a list of the frequencies and identifiers (BSICs) used by all or nearby base stations of its network. With this knowledge it could detect and analyse the frequencies of more than one base station, for extra accuracy or to allow for fail-safe redundancy. The list may also include information on base stations from other networks if their transmissions are to be used for frequency setting too. In practice, the list could be stored centrally (e.g. in GWU 120) and sent to the receiver/analysis unit as required. Forbidden carriers can be added manually to the list, for example if there is strong coverage from another system.

When the receiver/analysis hardware is to detect a frequency it searches for the strongest suitable carrier signal (preferably a broadcast signal such as the BCCH signal in a GSM-type network) and continuously receives and decodes synchronisation bursts. This provides a reference clock to the receiver unit's internal oscillator. The receiver unit may measure the frequency/timing of the received signal using the "time-base counter" principle, according to which the TDMA frame number (e.g. of a GSM transmission), timeslot number and number of the 1/4 bit are followed in accordance with GSM specification 05.10. The carrier signal may be one from an external network, which is not used in the system implementing the frequency measurement. Of course, analogous principles may be used in networks operating according to other standards, including non-TDMA standards.

If the receiver/analysis unit is unable to receive satisfactorily from the location of its IMC/BSC then an external antenna can be provided to improve the reception quality to that needed for reliably reading the frequency. For instance, in a GSM-type system the receiver needs only to be capable of accurately receiving synchronisation bursts.

The accuracy of this reference clock signal received by the receiver/analysis unit over the air interface is about the same as the serving base station's under good radio conditions. If the clock of the serving base station is running more precisely than the relevant specification calls for then there may even be significant room for loss of accuracy over the air interface due to non-ideal radio conditions.

If the receiver/analysis unit loses the signal it is receiving then it preferably searches for another suitable carrier. The base stations that rely on the receiver/analysis unit should have sufficiently stable clocks to cope with a short break in the clock signals they receive from the IMC/BSC in order to be able to deal with a short interruption of this nature and still stay within the specified tolerance. One approach to increase the stability of the system under these conditions is to provide an additional clock at the IMC/BSC for supporting the base stations when the receiver/analysis unit loses signal or fails. This may be more economical than providing a more accurate clock at every base station. If the base stations were to provide support for interruptions to the clock pulses then in a GSM system their clocks should exceed the accuracy of 0.05 ppm demanded by GSM specifications for the carrier frequency.

For additional accuracy, the receiver of the receiver/analysis unit could be capable of detecting the frequency of more than one base station, for example six base stations. If one of the detected base stations is one whose frequency is to be set by means of that very receiver/analysis unit then there may be a feedback loop whereby the clock of the base station may be accurately advanced or retarded to match or otherwise be set in accordance with a desired ratio relative to the frequency of another base station whose signals are received.

As the network is started up it is possible for each base station to transmit only on its broadcast (e.g. BCCH) channel until all transmission frequencies have reached sufficient accuracy in frequency, or frequency equalisation has been established, and only then to begin use of its traffic channels.

As an example of the time span needed to achieve synchronisation, the required accuracy in GSM is 0.05 PPM, which corresponds to 3 μs/min. In GSM the bit duration is 3.7 μs so the duration of a quarter bit is 0.9 μs. This allows in theory an accuracy of 0.015 PPM to be achieved using the information gathered over a minute. Taking errors into account (for instance inaccuracies in the clocks at base stations and/or IMCs/BSCs) it would be expected that this one minute period should be sufficient to achieve sufficient accuracy in frequency in accordance with the accuracy requirements of the GSM standard.

The present invention may include any feature or combination of features disclosed herein either implicitly or explicitly or any generalisation thereof irrespective of whether it relates to the presently claimed invention. In view of the foregoing description it will be evident to a person skilled in the art that various modifications may be made within the scope of the invention.

The invention claimed is:

1. A frequency setting unit for a radio telecommunications network wherein base stations transmit at an accurately set frequency derived from a reference signal, the frequency setting unit comprising:
    a radio receiver for receiving signals at a first frequency from a first base station located in a first radio telecommunication network;
    an analysis apparatus for analysing the received signals to determine the first frequency; and
    a frequency setting apparatus responsive to the analysis apparatus and coupled to a second base station transmitting at a second frequency, located in a second radio telecommunication network, for adjusting the second frequency with the aim of establishing a desired relationship between the second frequency and the first frequency.

2. A frequency setting unit as claimed in claim 1, wherein said reference signal is provided to the first base station by a reference clock where a pulse train is sent to a first controller controlling the first base station.

3. A frequency setting unit as claimed in claim 2, wherein said sent pulse train is used by the first controller to derive a set of pulse trains that are sent to said first base station.

4. A frequency setting unit as claimed in claim 1, wherein the second base station comprises a clock and the frequency setting unit is capable of transmitting a clock setting signal to the second base station for setting the clock.

5. A frequency setting unit as claimed in claim 4, wherein the clock setting signal comprises a stream of clock pulses.

6. A frequency setting unit according to claim 4, wherein said clock setting signal to the second base station for setting said clock is derived from an internal clock within said second base station.

7. A frequency setting unit according to claim 4, wherein said clock setting signal to the second base station for setting said clock is derived straight from the detected frequency of said analysis apparatus.

8. A frequency setting unit according to claim 1, wherein said desired relationship is such that the second frequency matches the first frequency in an absolute manner.

9. A frequency setting unit according to claim 1, wherein said desired relationship is such that the second frequency is a multiple of the first frequency by shifting the frequency of said internal clock within a second controller controlling said base station.

10. A frequency setting unit according to claim 1, wherein the said signals from the first base station (23) are broadcast signals.

11. A frequency setting unit as claimed in claim 1, wherein the frequency setting unit is comprised in said second controller controlling said second base station.

12. A frequency setting unit as claimed in claim 1, wherein the second base station is connected to the second telecommunications network by means of an asynchronous connection.

13. A frequency setting unit as claimed in claim 12, wherein the asynchronous connection is an internet protocol connection.

14. A frequency setting unit as claimed in claim 1, wherein at least one of said first and second telecommunications networks is operable according to a global system for mobile communications standard.

15. A method for frequency setting in a wireless telecommunications network such that base stations transmit at an accurately set frequency derived from a reference signal, wherein a first base station transmitting signals at a first frequency, and a second base station transmitting signals at a second frequency, and the first and second base stations are of different radio telecommunications networks; the method comprising the steps of:
receiving signals in a radio receiver from the first base station;
analysing the received signals in an analysis apparatus to determine the first frequency; and
adjusting the second frequency in a frequency setting unit responsive to the analysis and coupled to the second base station with the aim of establishing a desired relationship between the second frequency and the first frequency.

16. A frequency setting unit as claimed in claim 1, wherein the frequency setting unit is a Base Station Controller.

17. A frequency setting control unit as claimed in claim 1, wherein the frequency control unit is provided on an expansion card.

18. An expansion card for a radio telecommunications network wherein base stations transmit at an accurately set frequency derived from a reference signal, the expansion card comprising:
a receiver for receiving signals from a first base station located in a first radio telecommunications network;
an analysis apparatus for analysing the received signals to determine a first frequency; and
a frequency setting unit responsive to the analysis apparatus and coupled to a second base station, located in a second radio telecommunications network, for adjusting a second frequency with the aim of establishing a desired relationship between the second frequency and the first frequency.

19. An expansion card as claimed in claim 18, wherein the expansion card is adapted to be inserted to a network element responsible of controlling base station operations.

20. A frequency setting unit for a radio telecommunications network wherein base stations transmit at an accurately set frequency derived from a reference signal, the frequency setting unit comprising:
means for receiving signals having a first frequency from a first base station located in a first radio telecommunications network;
means for analysing the received signals to determine the first frequency; and
means for adjusting a second frequency with the aim of establishing a desired relationship between the second frequency and the first frequency, the means for adjusting being responsive to the means for analysis and coupled to a second base station transmitting signals with the second frequency, located in a second radio telecommunications network.

21. A base station for a radio telecommunications network, the base station comprising:
a radio receiver for receiving signals having a first frequency from a reference base station located in a different radio telecommunication network;
an analysis apparatus for analysing the received signals to determine the first frequency;
a frequency setting unit responsive to the analysis apparatus for adjusting a second frequency with the aim of establishing a desired relationship between the second frequency and the first frequency and for sending a clock-setting signal for a clock; and
the clock for providing a clock signal for the base station, the clock being set according to the clock-setting signal from the frequency setting unit.

22. A network element for controlling base stations in a radio telecommunications network wherein base stations transmit at an accurately set frequency derived from a reference signal, the network element comprising:
a radio receiver for receiving signals having a first frequency from a first reference base station located in a first radio telecommunications network;
an analysis apparatus for analysing the received signals to determine the first frequency; and
a frequency setting unit responsive to the analysis apparatus and coupled to a second base station transmitting at a second frequency, located in a second radio telecommunications network, for adjusting the second frequency with the aim of establishing a desired relationship between the second frequency and the first frequency.

23. A network element according to claim 22 wherein the network element is part of the second telecommunications network.

24. A network element according to claim 22 wherein the network element is a Base Station Controller.

25. A synchronization unit for a radio telecommunications network wherein base stations transmit at an accurately set frequency derived from a reference signal, the synchronization unit comprising:
a radio receiver for receiving signals having a first frequency from a first reference base station located in a first radio telecommunication network,
an analysis apparatus for analysing the received signals to determine the first frequency; and
a connection for coupling the synchronization unit to a frequency setting unit responsive of adjusting the frequency of a second base station, located in a second radio telecommunications network.

26. A synchronization unit according to claim 25, wherein the synchronization unit is a mobile handset.

27. A system of at least first and second radio telecommunications networks wherein each base station transmits signals at an accurately set frequency derived from a reference signal, the system comprising:
a radio receiver for receiving signals having a first frequency from a first reference base station located in a first radio telecommunications network;

an analysis apparatus for analysing the received signals to determine the first frequency; and a frequency setting unit responsive to the analysis apparatus and coupled to a second base station transmitting at a second frequency, located in a second radio telecommunications network, for adjusting the second frequency with the aim of establishing a desired relationship between the second frequency and the first frequency.

* * * * *